United States Patent [19]

Furuta et al.

[11] Patent Number: 5,612,101
[45] Date of Patent: Mar. 18, 1997

[54] HOLLOW MOLDED ARTICLE CONTAINER AND METHOD FOR PRODUCING THE SAME

[75] Inventors: Motonobu Furuta, Chiba; Takanari Yamaguchi, Ibaraki, both of Japan

[73] Assignee: Sumitomo Chemical Company, Limited, Osaka, Japan

[21] Appl. No.: 648,514

[22] Filed: May 13, 1996

[30] Foreign Application Priority Data

May 12, 1995 [JP] Japan .................................. 7-114437
Sep. 14, 1995 [JP] Japan .................................. 7-236879

[51] Int. Cl.⁶ .................................................. C09K 19/00
[52] U.S. Cl. .................... 428/1; 206/524.1; 206/524.2; 206/524.3; 206/524.4; 280/830; 220/562; 220/415; 220/456; 220/457
[58] Field of Search .................. 428/1; 206/524.1, 206/524.2, 524.3, 524.4; 280/830; 220/562, 415, 456, 457

[56] References Cited

U.S. PATENT DOCUMENTS 5,216,073 6/1993 Haider et al. ........................ 525/66
5,364,669 11/1994 Sumida et al. ........................ 428/1

*Primary Examiner*—Charles Nold

[57] ABSTRACT

The present invention provides a hollow molded article container of a liquid polyester resin composition which is superior in moldability, heat resistance, gas barrier properties and gasoline barrier properties. The liquid polyester resin composition comprises a liquid crystal polyester as a component (A) and an epoxy group-containing ethylene copolymer of 50.0 through 99.9% by weight of an ethylene unit (a), 0.1 through 30.0% by weight of an unsaturated carboxylic acid glycidyl ester unit or unsaturated glycidyl ether unit (b) and 0 through 49.9% by weight of an ethylenically unsaturated ester unit (c) as a component (B), wherein the component (A) is 56.0 through 99.0% by weight and the component (B) is 44.0 through 1.0% by weight. The invention also provides a hollow molded article container composed of a laminated structure comprising a layer of the liquid crystal polyester resin composition above and a layer of a thermoplastic resin.

12 Claims, No Drawings

HOLLOW MOLDED ARTICLE CONTAINER AND METHOD FOR PRODUCING THE SAME

FIELD OF THE INVENTION

The present invention relates to a hollow molded article container having good moldability as well as excellent heat resistance and gas barrier properties, and a method for producing the same.

BACKGROUND OF THE INVENTION

A hollow molded article container of a resin, which is lightweight and has gas barrier properties, has recently been used for applications such as foods, beverages, industrial drugs, cosmetics, etc. For example, hollow molded article containers of ethylene-vinyl alcohol copolymer, vinylidene chloride, polyethylene terephthalate, etc. have been known.

However, hollow molded article containers obtained by blow molding these resins were not sufficient in heat resistance and gas barrier properties, In case that contents are charged in the container at elevated temperature or the container is washed with liquid of elevated temperature, the container of these resins is sometimes insufficient in heat resistance.

Unlike a crystalline polyester such as polyethylene terephthalate, polybutyrene terephthalate, etc., the liquid crystal polyester causes no entanglement in a molten state because of rigid-rod molecular shape, and shows such a behavior that a polydomain having a liquid crystal state under adequate temperature is formed and a molecular chain is oriented in a flow direction due to a low shear action. Therefore, it is normally referred to as a melting type liquid crystal (thermotropic liquid crystal) polymer.

It has hitherto been known that the liquid crystal polyester has a heat resistance and shows excellent gas barrier properties. However, the liquid crystal has a large anisotropy and a low melt viscosity and, therefore, it is extremely difficult to obtain a good hollow molded article container of the liquid crystal polyester due to blow molding.

Regarding a molded article container of the liquid crystal polyester or liquid crystal polyester resin composition, for example, a hollow molded article obtained by melt molding a resin composition comprising a liquid crystal polyester and a polyester having a specific structure is described in JP-A-61-192762.

In JP-A-2-263646 and JP-A-3-269054, a container having excellent gas barrier properties obtained by molding a blend of polyethylene terephthalate and a liquid crystal polyester is described.

In JP-A-1-289826, a molded article of a laminate comprising a polyethylene terephthalate layer and a liquid crystal polyester layer is described. In JP-A-4-166320, a method for producing a container of a liquid crystal polyester having a specific structure is described.

However, in any case, there are problems such as difficulty in producing a molded article container having an excellent appearance, low productivity, insufficient gas barrier properties of the container, etc. Therefore, requirements of the market are still to be satisfied.

In the field of the automobile industry, a gasoline tank made of plastic has recently been requested by the market in view of lightweight properties, moldability, strength, design freedom, etc, and it had been studied for years.

For example, polyethylene is superior in moldability, strength, etc., but is insufficient in gasoline barrier properties.

In JP-B-1-14049, a fuel tank of a multi-layer hollow molded article comprising a barrier layer of a material selected from polyamide, polyester and ethylene-vinyl acetate copolymer and a modified polyolefin layer is described.

In JP-A-4-47938, a fuel tank of a multi-layer hollow molded article comprising a polyamide layer, a high-density polyethylene layer and a modified high-density polyethylene layer is described.

However, these fuel tanks comprising the polyamide layer as the barrier layer are insufficient in gas barrier properties, and barrier properties to an alcohol-mixed fuel such as methanol-mixed fuel are further insufficient.

In JP-A-6-191296, an automobile fuel tank of a hollow molded article having a multi-layer structure comprising a copolymerized polyamide layer (of aromatic polyamide and nylon 6) as the barrier layer, a modified high-density polyethylene layer and a high-density polyethylene layer is described.

JP-A-6-218891 discloses a fuel tank of a multi-layer molded article comprising a barrier layer of a blend of polyethylene and polyamide.

In JP-A-7-52333, a fuel tank of a multi-layer structure comprising a layer of a resin composition of a thermoplastic resin and an ethylene-vinyl alcohol copolymer is described. In JP-A-7-40998, a flame retardant foamed plastic is described.

However, these fuel tanks were also insufficient in gasoline barrier properties or so-called barrier properties to gas hole, which is a mixture of gasoline and methanol, i.e. gas hole barrier properties. Furthermore, it was necessary to make a thickness of a resin layer extremely large so as to maintain high barrier properties.

Since the tank is a multi-layer structure, various problems such as interlayer peeling has still to be solved.

SUMMARY OF THE INVENTION

An object of the present invention is to provide a hollow molded article container of a liquid polyester resin composition, which is superior in moldability, heat, resistance, gas barrier properties and gasoline barrier properties, and a method for producing the same.

That is, the present invention comprises the following inventions.

[1] A hollow molded article container of a liquid crystal polyester resin composition comprising a liquid crystal polyester as a component (A) and an epoxy group-containing ethylene copolymer of 50.0 through 99.9% by weight of an ethylene unit (a), 0.1 through 30.0% by weight an unsaturated carboxylic acid glycidyl ester unit or unsaturated glycidyl ether unit (b) and 0 through 49.9% by weight of an ethylenically unsaturated ester unit (c) as a component (B), wherein the component (A) is 56.0 through 99.0% by weight and the component (B) is 44.0 through 1.0% by weight.

[2] The hollow molded article container according to claim [1], wherein the liquid crystal polyester as the component (A) is obtained by reacting an aromatic dicarboxylic acid, an aromatic diol and an aromatic hydroxycarboxylic acid

[3] The hollow molded article container according to claim [1], wherein the liquid crystal polyester as the component (A) is obtained by reacting a combination of different aromatic hydroxycarboxylic acids.

[4] The hollow molded article container according to claim [1], wherein the liquid crystal polyester as the component (A) contains the following repeating unit.

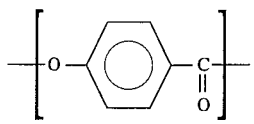

[5] The hollow molded article container according to claim [1], wherein the liquid crystal polyester as the component (A) comprises the following repeating unit.

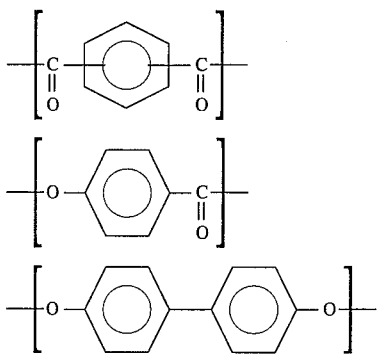

[6] The hollow molded article container according to claim [1], wherein the liquid crystal polyester as the component (A) comprises the following repeating unit.

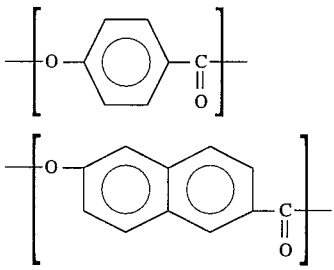

[7] The hollow molded article container according to claim [1], wherein the liquid crystal polyester as the component (A) comprises the following repeating unit.

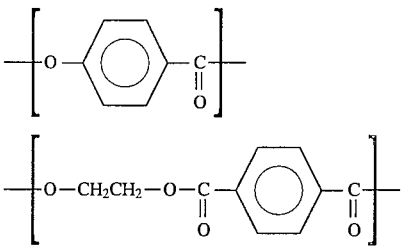

[8] The hollow molded article container according to claim [1], wherein the epoxy group-containing ethylene copolymer as the component (B) has a stiffness within the range from 10 to 1300 kg/cm².

[9] A hollow molded article container composed of a laminated structure comprising a layer of the liquid crystal polyester resin composition described in claim [1] and a layer of a thermoplastic resin.

[10] The hollow molded article container according to claim [9], wherein the thermoplastic resin is at least one sort of a thermoplastic resin selected from polyolefin, polyester and polyamide.

[11] The hollow molded article container according to claim [9] wherein the thermoplastic resin is a high-density polyethylene.

[12] A method for producing the hollow molded article container of claim [1] or [9], which comprises producing by blow molding.

DETAILED DESCRIPTION OF THE INVENTION

The present invention is described in more detail in the followings.

The liquid crystal polyester as the component (A) in the liquid crystal polyester resin composition used in the present invention is a polyester called thermotropic liquid crystal polymer.

Specifically, said polyester includes:

(1) one produced from a combination of an aromatic dicarboxylic acid, an aromatic diol and an aromatic hydroxycarboxylic acid, (2) one produced from a combination of different kinds of aromatic hydroxycarboxylic acids, (3) one produced from a combination of an aromatic dicarboxylic acid and a nucleus substituted aromatic diol, and (4) one obtainable by the reaction of a polyester such as polyethylene terephthalate or the like and an aromatic hydroxycarboxylic acid, all forming isotropic melt at a temperature of 400° C. or below. The aromatic dicarboxylic acid, the aromatic diol, and the aromatic hydroxycarboxylic acid may be replaced by ester derivatives thereof. Exemplified repeating units of the liquid crystal polyester are given below although the liquid crystal polyester is not limited to these structures.

Repeating units originating from aromatic dicarboxylic acids:

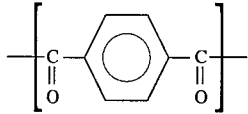

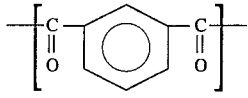

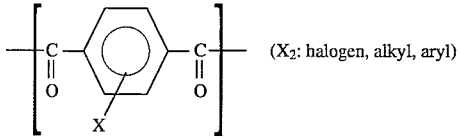

($X_2$: halogen, alkyl, aryl)

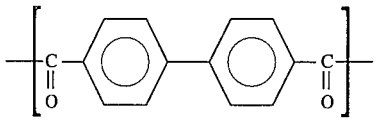

-continued

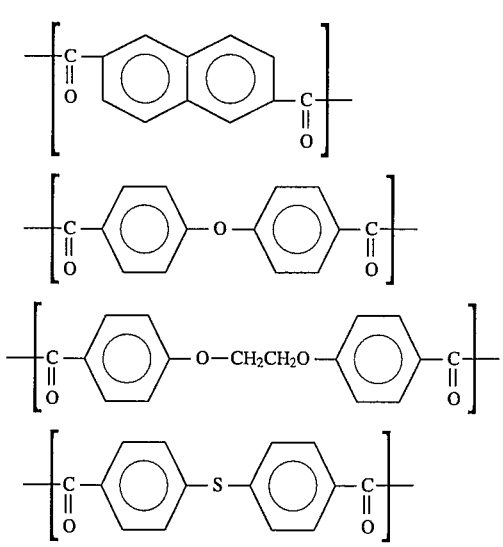

Repeating units originating from aromatic diols:

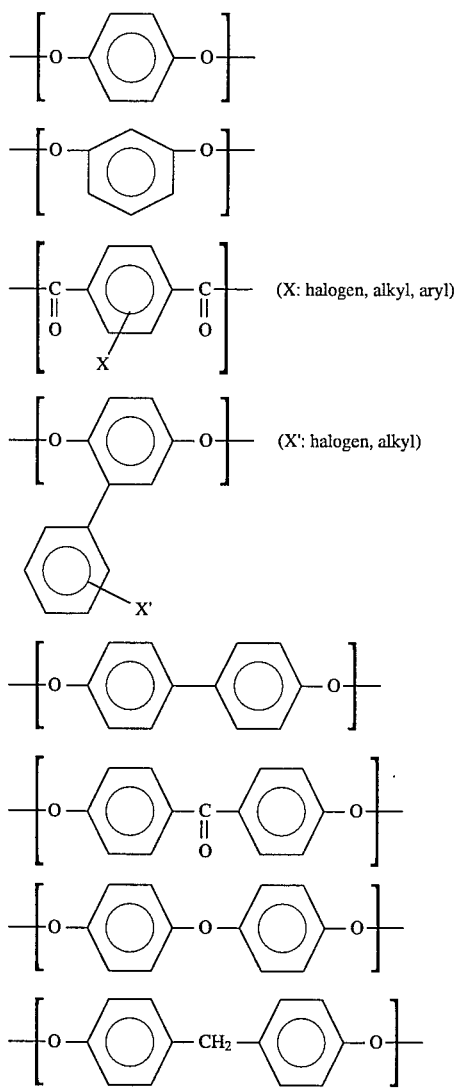

(X: halogen, alkyl, aryl)

(X': halogen, alkyl)

-continued

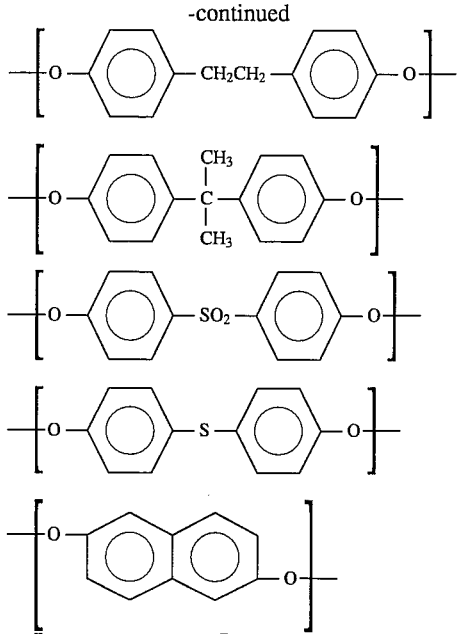

Repeating units originating from aromatic hydroxycarboxylic acids:

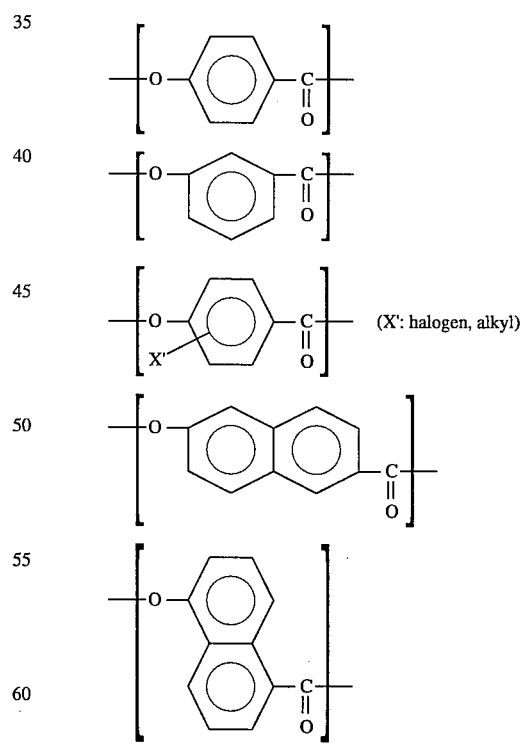

(X': halogen, alkyl)

Particularly preferred liquid crystal polyesters because of well-balanced heat resistance, mechanical properties and processibilities have the following repeating unit:

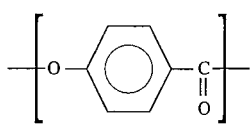

and more specifically a combination of repeating units (I) through (V):

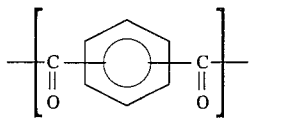 (I)

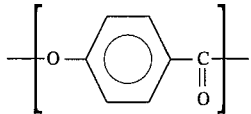 (II)

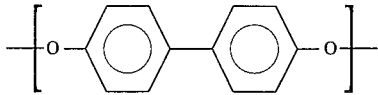

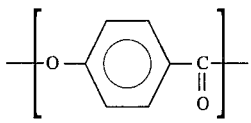

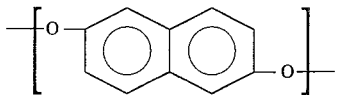

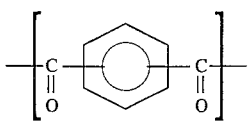 (III)

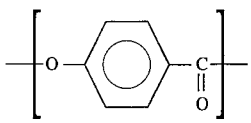

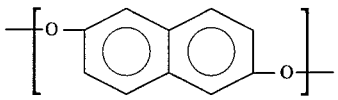

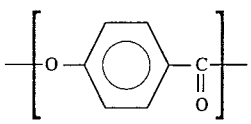 (IV)

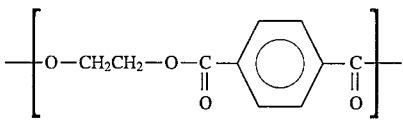

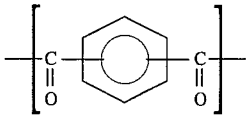 (V)

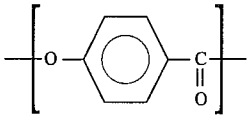

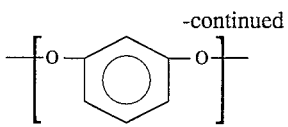

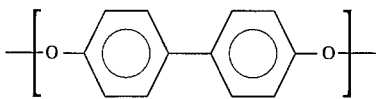

The liquid crystal polyesters (I), (II), (III) and (IV) are described, for example, in JP-B-47-47870, JP-B-63-3888, JP-B-63-3891, JP-B-56-18016 and others. Preferred combinations of units are combinations (I) and (II).

For application of the laminate according to the invention to fields in which a higher heat resistance is required, the liquid crystal polyester of component (A) in the liquid crystal polyester resin composition preferably includes 30 through 80% by mole of a repeating unit (a'), 0 through 10% by mole of a repeating unit (b'), 10 through 25% by mole of a repeating unit (c'), and 10 through 35% by mole of a repeating unit (d'):

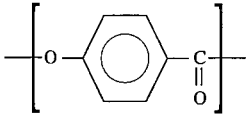 (a')

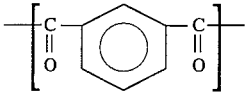 (b')

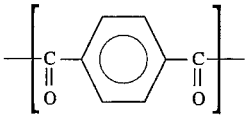 (c')

$+O-Ar-O+$ (d')

wherein Ar represents a divalent aromatic group.

The inherent viscosity (ηinh) of the liquid crystal polyester in the present invention is measured at 60° C. using an Ubbelohde viscometer after dissolving the liquid crystal polyester (0.1 g) in 2,3,5,6-tetrafluorophenol (10 cc).

The inherent viscosity (ηinh) of the liquid crystal polyester in the present invention is preferably from 1.0 to 8.0, more preferably from 2.0 to 6.0.

When the inherent viscosity (ηinh) of the liquid crystal polyester is not within the above range, the moldability of the resulting composition is inferior and mechanical strength and heat resistance thereof are insufficient, sometimes, and it is not preferred.

In the present invention, it is preferable to use an epoxy group-containing ethylene copolymer as the component (B) in the liquid crystal polyester resin composition. The epoxy group-containing ethylene copolymer refers to an epoxy group-containing ethylene copolymer comprising: (a) 50 through 99.9% by weight, preferably 60 through 99% by weight, of an ethylene unit; (b) 0.1 through 30% by weight, preferably 0.5 through 25% by weight, of a glycidyl (unsaturated) carboxylate unit or an unsaturated glycidyl ether unit; and (c) 0 through 49.9% by weight, preferably 0.5 through 40% by weight, of an ethylenically unsaturated ester compound unit.

Compounds capable of providing the glycidyl (unsaturated) carboxylate unit and the unsaturated glycidyl ether unit (b) in the epoxy group-containing ethylene copolymer (B) are represented by the following formulae:

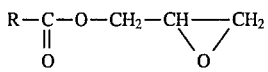

wherein R represents a hydrocarbon group having an ethylenically unsaturated bond and containing 2 through 13 carbon atoms,

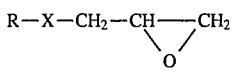

wherein R represents a hydrocarbon group having an ethylenically unsaturated bond and containing 2 to 18 carbon atoms and X denotes —$CH_2$—O— or a group:

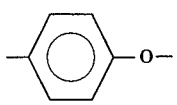

Specific examples include glycidyl acrylate, glycidyl methacrylate, glycidyl itaconate, allyl glycidyl ether, 2-methylallyl glycidyl ether, styrene-p-glycidyl ether and the like.

The epoxy group-containing ethylene copolymer referred to in the present invention may be a terpolymer or multi-unit copolymers containing ethylene, glycidyl (unsaturated) carboxylate or unsaturated glycidyl ether, and ethylenically unsaturated ester compound (c).

Examples of ethylenically unsaturated ester compounds (c) include vinyl carboxylates and alkyl α, β-unsaturated carboxylates, such as vinyl acetate and vinyl propionate, methyl acrylate, ethyl acrylate, butyl acrylate, methyl methacrylate, ethyl methacrylate, and butyl methacrylate. Vinyl acetate, methyl acrylate, and ethyl acrylate are particularly preferred.

Examples of the epoxy group-containing ethylene copolymers (B) used in the present invention include a copolymer comprising ethylene units and glycidyl methacrylate units, a copolymer comprising ethylene units, glycidyl methacrylate units and methyl acrylate units, a copolymer comprising ethylene units, glycidyl methacrylate units and ethyl acrylate units, a copolymer comprising ethylene units, glycidyl methacrylate units and vinyl acetate units, and the like.

The melt index (hereinafter may be referred to as MFR: measured at 190° C. under a load of 2.16 kg in conformity with JIS K6760) of the epoxy group-containing ethylene copolymer (B) is preferably in a range of 0.5 through 100 g/10 minutes and more preferably in a range of 2 through 50 g/10 minutes. The melt index outside the range is allowable but the index greater than 100 g/10 minutes results in poor mechanical properties of the resulting resin composition while that less than 0.5 g/10 minutes lowers the compatibility with the liquid crystal polyester of component (A) and therefore both cases are not preferred.

The epoxy group-containing ethylene copolymer (B) preferably has stiffness modulus in a range of 10 through 1300 kg/cm$^2$ and more preferably in a range of 20 through 1100 kg/cm$^2$. The stiffness modulus out of the above range is not preferred because it may result in insufficient moldability and mechanical properties of the resulting resin composition.

The epoxy group-containing ethylene copolymer (B) is prepared by copolymerizing an unsaturated epoxy compound and ethylene in the presence of a radical polymerization initiator at 500 through 4000 atm and 100 through 300° C. in the presence or absence of an appropriate solvent and a chain transfer agent. Alternatively, it may be produced by mixing polyethylene with an unsaturated epoxy compound and radical polymerization initiator and then melt-graft-copolymerizing in an extruder.

As regards the ratio of the component (A) to the component (B) included in the liquid crystal polyester resin composition of the invention, the content of the component (A) is 56.0 through 99.0% by weight, preferably 65.0 through 99.0% by weight and more preferably 70.0 through 98.0% by weight while the content of the component (B) is within a range of 44.0 through 1.0% by weight, preferably 35.0 through 1.0% by weight and more preferably 30.0 through 2.0% by weight. The content of the component (A) less than 56.0% by weight deteriorates the moldability and lowers the gas-barrier properties and the tensile strength of the composition. The same greater than 99.0% by weight may not sufficiently improve anisotropy in the tensile strength of the composition.

The liquid crystal polyester resin composition used in the invention may be manufactured by any known method without particular limitation. For example, the component dissolved in a solvent are mixed and recovered by evaporation of the solvent or precipitation. An industrially preferable method is to knead the components in the molten state. Known kneading apparatus including single screw extruders, twin-screw extruders, and various kneaders are applicable to the melt-heading process. Especially, biaxial high-speed kneaders are preferably applied.

For the kneading process, the temperature in the cylinders of the kneading machine is set preferably in a range of 200° through 360° C. and more preferably in a range of 230° through 340° C.

Each component may be pre-mixed to the homogeneous state with a tumbling mixer or Henschel mixer. However, the components may be separately introduced quantitatively into a kneader without pre-mixing.

The kneaded composition can be molded by various kinds of film-molding processes. Alternatively, the resin composition of the present invention may be prepared by kneading in the course of melt-processing for molding of a dry-blend, without pre-kneading, in order to give a molded product directly.

An inorganic filler may be added, if desired, to the liquid crystal polyester resin composition used in the invention. Examples of the applicable inorganic filler include talc, clay, fillers for intercalation such as montmorillonite and the like.

Various additives may also be added to the liquid crystal polyester resin composition used in the present invention, if desired, in the preparation process or the subsequent processing process. Such additives include organic fillers, antioxidants, heat stabilizers, light stabilizers, flame retardants, lubricants, antistatic agents, inorganic or organic colorants, rust preventives, crosslinking agents, foaming agents, fluorescent agents, surface smoothing agents, surface gloss improvers and mold release agents such as fluoropolymers.

The hollow molded article composed of a laminated structure comprising a liquid crystal polyester resin composition layer and a thermoplastic resin layer of the present invention is suitable for a container for fuel.

As the thermoplastic resin, there can be used any thermoplastic polymer except liquid crystalline polyesters and their resin compositions. There can be preferably used at least one sort of a thermoplastic resin selected from polyolefin, polyester and polyamide.

As the polyolefin, there can be used a homopolymer or a copolymer of olefin having 2 to 20 carbon atoms. Examples the olefin and diolefin include ethylene, propylene, butene-1, pentene-1, hexene-1, heptene-1, octene-1, nonene-1, decene-1, hexadecene-1, eicosene-1, 4-methylpentene-1, 5-methyl-2-pentene-1, etc. Examples of the polyolefin include low-density polyethylene, high-density polyethylene, polypropylene, poly-1-butene, poly-4-methylpentene-1, ethylene/butane-1 copolymer, ethylene/4-methylpentene-1 copolymer, ethylene/hexene-1 copolymer, propylene/ethylene copolymer, propylene/butene-1 copolymer, etc.

Examples of the polyester include polycondensate of divalent carboxylic acid and divalent alcohol. In that case, it is preferably polycondensate of aromatic dicarboxylic acid and alkylene glycol. Example of the polyester include and alkylene glycol. Example of the polyester include polyethylene terephthalate, polybutylene terephthalate, etc.

Examples of the polyamide include polycondensate of divalent carboxylic acid and divalent amine, polycondensate of aminocarboxylic acid, etc. Specific examples of the polyamide include polyamide 6, polyamide 12, polyamide 11, polyamide 6-6, polyamide 6-12, polyamide MXD6, etc.

Among these thermoplastic resins, polyolefin is preferred, and a high-density polyethylene having a density of 0.940 to 0.980 and an intrinsic viscosity of 2 to 7 dl/g is used, more preferably.

The laminated structure constituting the hollow molded article container of the present invention is a laminate obtained by the above method, comprising at least two sorts of layers, i.e. liquid crystal polyester resin composition layer and thermoplastic resin layer. In addition to this two-layer structure, a three-layer structure wherein thermoplastic resin layers are laminated on both sides of the liquid crystal polyester resin composition layer and a five-layer structure wherein liquid crystal polyester resin composition layers and thermoplastic resin layers are laminated alternatively can also be used. Furthermore, a laminate comprising layers other than the above liquid crystal polyester resin composition or thermoplastic resin layer can also be used.

Next, a method for producing the hollow molded article container of the liquid crystal polyester resin composition of the present invention will be explained.

As the method for producing the hollow molded article of the present invention, there is a blow molding method. Examples thereof include extrusion blow molding method (direct blow molding method) comprising blow molding the melt-extruded pipe, i.e. parison before the parison is cooled, injection blow molding method comprising injection molding a parison and blow molding the parison, stretching blow molding method comprising stretching at the time of the blow molding, etc.

In the blow molding method, the hollow molded article container composed of the laminated structure of the present invention can be obtained by a multi-layer blow method comprising extruding resins of the respective layers in a molten state into the same die having the same circular flow path, laminating the respective layers in the die to form a parison, expanding the parison by a gas pressure and making the mold and parison come closely into contact.

The liquid crystal polyester resin layer and thermoplastic resin layer, which constitute the laminated structure of the present invention, have good adhesive properties and a sufficient adhesive strength can be obtained by hot bonding at the time of the blow molding and, therefore, an adhesive layer is not required between the respective layers. Accordingly, the production process of the laminated structure can be simplified in comparison with a conventional multi-layer blow method.

The cylinder set temperature and die set temperature in the blow molding method is preferably within the range from 200° to 360° C., more preferably from 230° to 350° C.

The gas blown into the interior of the parison at the time of the blow molding is not specifically limited, and air is preferably used.

The following Examples and Comparative Examples further illustrate the present invention in detail but are not to be construed to limit the scope thereof.

(1) Liquid crystal polyester of component (A)

(i) p-Acetoxybenzoic acid (10.8 kg, 60 mol), terephthalic acid (2.49 kg, 15 mol), isophthalic acid (0.83 kg, 5 mol) and 4,4'-diacetoxydiphenyl (5.45 kg, 20.2 mol) were charged in a polymerization tank equipped with a comb-type stirring blade, and the mixture was polymerized by heating to 330° C. with stirring under a nitrogen gas atmosphere for one hour. The mixture was further polymerized with stirring by-product in the reaction in a cooling tube, followed by recovering and further removing. Then, the system was cooled gradually and the polymer obtained at 200° C. was removed from the system. The resulting polymer was pulverized using a hammer mill manufactured by Hosokawa Micron Co., Ltd. to form particles having a particle size of not more than 2.5 mm. The resulting particles were further treated in a rotary kiln under a nitrogen gas atmosphere at 280° C. for 3 hours to obtain a particulate whole aromatic polyester having the following repeating unit (flow temperature: 324° C.). The liquid crystal polyester is abbreviated to "A-1", hereinafter. This polymer showed an optical anisotropy under pressure at not less than 340° C. The intrinsic viscosity (ηinh) measured at 60° C. using an Ubbelohde viscometer after dissolving A-1 (0.1 g) in 2,3,5,6-tetrafluolorophenol (10 cc) was 2.5. The repeating unit of the liquid crystal polyester A-1 is as follows.

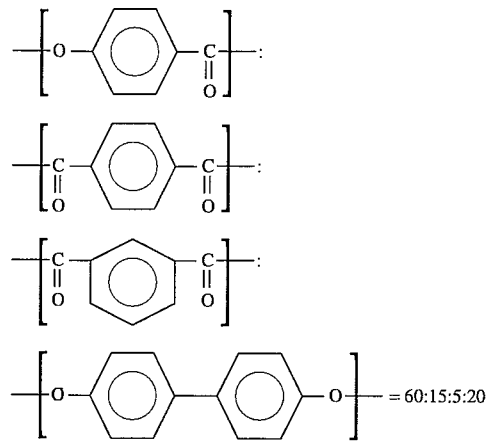

(ii) p-Hydroxybenzoic acid (16.6 kg, 12.1 mol), 6-hydroxy-2-naphthoic acid (8.4 kg, 4.5 mol) and acetic anhydride (18.6 kg, 18.2 mol) were charged in a polymerization tank equipped with a comb-type stirring blade, and the mixture was polymerized by heating to 320° C. with stirring under a nitrogen gas atmosphere for one hour and then polymerized under reduced pressure of 2.0 torr at 320° C. for one hour. An acetic acid formed as a by-product in the reaction was continuously distilled off. Then, the system was cooled gradually and the polymer obtained at 180° C. was removed from the system.

The resulting polymer was pulverized according to the same manner as that described in the above item (i) and the resulting particles were treated in a rotary kiln under a nitrogen gas atmosphere at 240° C. for 5 hours to obtain a particulate whole aromatic polyester having the following repeating unit (flow temperature: 270° C.). The liquid crystal polyester is abbreviated to "A-2", hereinafter. This polymer showed an optical anisotropy under pressure at not less than 280° C. The intrinsic viscosity (ηinh) was 5.1.

The ratio of the repeating unit of the liquid crystal polyester A-2 is as follows.

$$\left[ O-\bigcirc-\underset{O}{\overset{\|}{C}} \right] :$$

$$\left[ O-\bigcirc\bigcirc-\underset{O}{\overset{\|}{C}} \right] = 73:27$$

(iii) A mixture of polyethylene terephthalate having a logarithtic viscosity of 0.60 (0.691 kg, 3.6 mol) and p-hydroxybenzoic acid (0.972 kg, 5.4 mol) were charged in a 5 L flask equipped with a stirring blade, a distillation tube and a nitrogen gas inlet. After vacuuming and nitrogen gas-purging were repeated three times, the flask was kept at 275° C. and acetic acid was distilled off for 60 minutes with stirring under nitrogen atmosphere. Stirring was continued further for 4 hours at 275° C. under reduced pressure of 0.1 mmHg, and a liquid crystal polyester as the raw material was obtained.

This polymer showed an optical anisotropy under pressure at not less than 200° C. The liquid crystal polyester is abbreviated to "A-3". The ratio of the repeating unit of the liquid crystal polyester A-3 is as follows.

$$\left[ O-\bigcirc-\underset{O}{\overset{\|}{C}} \right] :$$

$$\left[ O-CH_2-CH_2-O-\underset{O}{\overset{\|}{C}}-\bigcirc-\underset{O}{\overset{\|}{C}} \right] = 54:36$$

(2) Epoxy group-containing ethylene copolymer of component (B)

The abbreviation, composition (weight ratio), melt flow index (MFR) and stiffness of the copolymer obtained by a high-pressure radical polymerization method are as follows.

The NMR (unit: g/10 minutes) is a value measured at 0° C. under a load of 2.16 kg according to JIS K6760. The stiffness is a value measured according to ASTM D7474.

b-1 (abbreviation): Bondfast 20B (manufactured by Sumitomo Chemical Co., Ltd. )

E/GMA/VA=83:12:5 (weight ratio)

MFR=20, stiffness=430 kg/cm$^2$ b-2 (abbreviation): Bondfast 7L (manufactured by Sumitomo Chemical Co., Ltd.)

E/GMA/MA=67:3:30 (weight ratio)

MFR=9, stiffness=60 kg/cm$^2$ b-3 (abbreviation): Bondfast 7A (manufactured by Sumitomo Chemical Co., Ltd.)

E/GMA/VA=89:3:8 (weight ratio)

MFR=7, stiffness=600 kg/cm$^2$ (E, GMA, MA and VA respectively indicate ethylene, glycidyl methacrylate, methyl acrylate and vinyl acetate.)

(3) Measurement of physical properties

Oxygen permeability:

The oxygen permeation amount per 1000 cc bottle was determined under the condition of 23° C. and 0% RH using model OXTRAN-100 manufactured by Modern Control Co.

Shrinkage % of bottle:

The shrinkage % of a bottle was determined by calculating according to the formula: (V1–V2)/V1×100% wherein V1 is an internal volume of the bottle before charging hot water and V2 is an internal volume of the bottle whose temperature is returned to room temperature after charging hot water at 95° C. in the bottle and removing hot water.

Gasoline permeability and gas hole permeability:

Gasoline (5 cc) (regular gasoline Zeas (trade name), manufactured by Idemitsu Petroleum co., Ltd.) was charged in a cup and the gasoline permeability was measured under the condition of 23° C. and a humidity of 60% according to JIS Z0208. In addition, the above gasoline (4 cc) and methanol (1 cc) were charged in a cup and the gas hole permeability was measured according to the same manner as that described above.

Drop resistance:

The resulting molded article contained was filled with water and dropped from a height of 16 m, and then the appearance of the container was visually observed. The criterion is as follows.

o: A cracking is observed on the container.

X: No cracking is formed on the container.

EXAMPLE 1 AND COMPARATIVE EXAMPLES 1 to 2

The components of the composition shown in Table 1 and a stabilizer are mixed using a Henschel mixer, and then molten and kneaded at 348° C. and 210 rpm using a twin-screw extruder having a screw diameter of 30 mm, model TEX-30 (manufactured by Nihon Seiko Co., Ltd) to obtain liquid crystal polyester resin composition pellets.

Then, the composition pellets were subjected to extrusion blow molding under the condition of a screw diameter of 50 mm, a screw revolution of 30 rpm, a die diameter of 25.5 mm, a nozzle diameter of 22 mm, a cylinder set temperature of 350° C., a die temperature of 352° C., an air bubbling pressure of 1.8 kg/cm$^2$, a cycle time of 15 seconds and a cooling time of 12 seconds to mold into a round bottle having a container inlet diameter of 30 mm, a height of 280 mm and a volume of 1000 cc.

The physical properties of the resulting bottle were measured. The results are shown in Table 1.

COMPARATIVE EXAMPLE 3

According to the same manner as that described in Example 1 except for setting the temperatures of the cylinder, the extruder and the die at 290° C., a bottle was molded and physical properties thereof were measured. The results are shown in Table 1.

EXAMPLES 2 AND 3 AND COMPARATIVE EXAMPLE 4

According to the same manner as that described in Example 1 except for using the components of the composition shown in Table 1 and changing the cylinder set temperature of model TEX-30, cylinder set temperature of a blow molding machine and die temperature to 285° C., 290° C. and 290° C., respectively, a bottle was molded and physical properties thereof were measured.

The results are shown in Table 1.

TABLE 1

| | Composition (% by weight) | | | Physical properties | |
|---|---|---|---|---|---|
| | Component (A) | Component (B) | Other component | Oxygen permeability (cc/bottle · day · atm) | Shrinkage % of bottle |
| Example 1 | A-1 82 | b-1 18 | 0 | 0.02 | –0*3 |
| Comparative Example 1 | A-1 100 | 0 | 0 | Impossible of molding | Impossible of molding |
| Comparative Example 2 | A-1 82 | 0 | 18*1 | Impossible of molding | Impossible of molding |
| Comparative Example 3 | 0 | 0 | 100*2 | 3.9 | 16 |
| Example 2 | A-2 96 | b-2 4 | 0 | 0.01 | –0*3 |
| Example 3 | A-2 67 | b-2 33 | 0 | 0.07 | 0.8 |
| Comparative Example 4 | A-2 100 | 0 | 0 | Impossible of molding | Impossible of molding |

*1 Low-density polyethylene manufactured by Sumitomo Chemical Industries Co., Ltd. trade name: Sumikasen G806 (stiffness: 1300 kg/cm$^2$)
*2 Polyethylene terephthalate (inherent viscosity; 0.5)
*3 less than limit of detection (3) Liquid polyester resin composition The respective components of the composition shown in Table 2 were mixed, and then molten and kneaded at a cylinder set temperature of 345° C. for SG-1, 290° C. for SG-2, 215° C. for SG-3 and SG-4, using a twin-screw extruder, Model TEX-30 (manufactured by Nihon Seiko Co., Ltd.) to obtain pellets of a resin composition.

TABLE 2

| Composition | | | | Set temperature |
|---|---|---|---|---|
| Component (A) | % by weight | Component (B) | % by weight | of the cylinder (°C.) |
| SG-1 | A-1 | 77 | b-3 | 23 | 345 |
| SG-2 | A-2 | 87 | b-2 | 13 | 290 |
| SG-3 | A-3 | 91 | b-2 | 9 | 215 |
| SG-4 | A-3 | 91 | *1 | 9 | 215 |

*1: Low-density polyethylene manufactured by Sumitomo Chemical Industries Co., Ltd.

EXAMPLE 4

A polyamide manufactured by Toyobo Co., Ltd (trade name: Nylon T-224, MI=20 g/10 minutes, specific gravity 1.08) was molten in a single-screw extruder I for outer layer of molded article having a screw diameter of 50 mm under the condition of a revolution of 120 rpm and a cylinder set temperature of 280° C. and a liquid crystal polyester resin composition SG-1 was molten in a single-screw extruder II for inner layer of molded article having a screw diameter of 50 mm under the condition of a revolution of 35 rpm and a cylinder set temperature of 343° C., using a multi-layer direct blow blow device.

Then, the resulting melts were allowed to flow into a die head from each extruder, separately, and joined in the interior of the die at a die set temperature of 348° C. After the respective layers were laminated according to a multi-manifold method, the laminate was extruded into a mold from the die and then a rectangular bottle having an internal volume of 2500 cc was obtained by a direct blow method of bubbling air. The construction and physical properties of this bottle container are as shown in Table 3.

According to the same manner as that described as described above except for using no single-screw extruder I, a rectangular bottle of a liquid crystal polyester resin composition was obtained. A test sample was cut off from this bottle, and then the gasoline permeability and gas hole permeability were measured. The results are shown in Table 3.

COMPARATIVE EXAMPLE 5

According to the same manner as that described in Example 4 except for using a liquid crystal polyester A-1 in place of the liquid crystal polyester resin composition SG-1, a trial of molding was made. As a result, a good bottle container was not obtained because of remarkable interlaminar peeling.

EXAMPLE 5

A high-density polyethylene manufactured by Showa Denko Co., Ltd (trade name: Showlex 4551H, MFR=0.05 g/10 minutes, density=0.945 g/cm$^3$) was molten in a single-screw extruder I for outer layer of molded article having a screw diameter of 50 mm under the condition of a revolution of 120 rpm and a cylinder set temperature of 220° C. and a liquid crystal polyester resin composition SG-2 was molten in a single-screw extruder II for inner layer of molded article having a screw diameter of 50 mm under the condition of a revolution of 35 rpm and a cylinder set temperature of 287° C., using a multi-layer direct blow device.

Then, the resulting melts were allowed to flow into a die head from each extruder, separately, and joined in the interior of the die at a die set temperature of 290° C. After the respective layers were laminated (according to a multi-manifold method), the laminate was extruded into a mold from the die and then a rectangular bottle having an internal volume of 2500 cc was obtained by a direct blow method of bubbling air.

According to the same manner as that described as described above except for using no single-screw extruder I, a rectangular bottle of a liquid crystal polyester resin composition was obtained. A test sample was cut off from this bottle, and then the gasoline permeability and gas hole permeability were measured. The results are shown in Table 3.

EXAMPLE 6

A high-density polyethylene manufactured by Showa Denko Co., Ltd (trade name: Showlex 4551H, MFR=0.05 g/10 minutes, density=0.945 g/cm$^3$) was molten in a single-screw extruder I for outer layer of molded article having a screw diameter of 50 mm under the condition of a revolution of 120 rpm and a cylinder set temperature of 190° C. and a liquid crystal polyester resin composition SG-3 was molten in a single-screw extruder II for inner layer of molded article having a screw diameter of 50 mm under the condition of a revolution of 35 rpm and a cylinder Set temperature of 206° C., using a multi-layer direct blow device.

Then, the resulting melts were allowed to flow into a die head from each extruder, separately, and joined in the interior of the die at a die set temperature of 206° C. After the respective layers were laminated (according to a multi-manifold method), the laminate was extruded into a mold from the die and then a rectangular bottle having an internal volume of 2500 cc was obtained by a direct blow method of bubbling air.

According to the same manner as that described as described above except for using no single-screw extruder I, a rectangular bottle of a liquid crystal polyester resin composition was obtained. A test sample was cut off from this bottle, and then the gasoline permeability and gas hole permeability were measured. The results are shown in Table 3.

COMPARATIVE EXAMPLE 6

According to the same manner as that described in Example 4 except for using SG-4 in place of SG-3, a trial of molding a container was made. As a result, a good bottle container was not obtained because of remarkable interlaminar peeling.

applications such as foods, beverages, industrial drugs, cosmetics, etc. The hollow molded article container composed of the laminated structure of the present invention is lightweight and has sufficient strength as well as gasoline barrier properties and gas hole barrier properties, and it can be used as a container for fuel.

What is claimed is:

1. A hollow molded article container of a liquid crystal polyester resin composition comprising a liquid crystal polyester as a component (A) and an epoxy group-containing ethylene copolymer of 50.0 through 99.9% by weight of an ethylene unit (a), 0.1 through 30.0% by weight of an unsaturated carboxylic acid glycidyl ester unit or unsaturated glycidyl ether unit (b) and 0 through 49.9% by weight of an ethylenically unsaturated ester unit (c) as a component (B), wherein the component (A) is 56.0 through 99.0% by weight and the component (B) is 44.0 through 1.0% by weight.

2. The hollow molded article container according to claim 1, wherein the liquid crystal polyester as the component (A) is obtained by reacting an aromatic dicarboxylic acid, an aromatic diol and an aromatic hydroxycarboxylic acid.

3. The hollow molded article container according to claim 1, wherein the liquid crystal polyester as the component (A) is obtained by reacting a combination of different aromatic hydroxycarboxylic acids.

4. The hollow molded article container according to claim 1, wherein the liquid crystal polyester as the component (A) contains the following repeating unit:

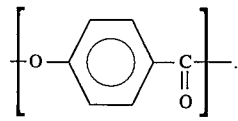

5. The hollow molded article container according to claim 1, wherein the liquid crystal polyester as the component (A) comprises the following repeating unit:

TABLE 3

| | Composition | | | | Physical properties | | |
| --- | --- | --- | --- | --- | --- | --- | --- |
| | Liquid crystal polyester resin composition layer | | Thermoplastic resin layer | | Gasoline | Gas hole | |
| | Sample No. | Thickness (μm) | Resin | Thickness (μm) | permeability (g/m$^2$ · day · atm) | permeability (g/m$^2$ · day · atm) | Drop resistance |
| Example 4 | SC-1 | 46 | Nylon *1 | 1500 | 0.006 | 0.008 | ○ |
| Example 5 | SG-2 | 28 | HDPE*2 | 1050 | 0.010 | 0.011 | ○ |
| Comparative Example 5 | A-1 | — | HDPE*2 | — | impossible of molding | — | — |
| Example 6 | SG-3 | 55 | HDPE*2 | 1600 | 0.025 | 0.031 | ○ |
| Comparative Example 6 | SG-4 | — | HDPE*2 | — | impossible of molding | — | — |

*1: Nylon T-224 (trade name), manufactured by Toyobo Co., Ltd.
*2: High-density polyethylene Showlex 4551H (trade name), manufactured by Showa Denko Co., Ltd.

The hollow molded article container of the present invention has good moldability as well as excellent heat resistance and gas barrier properties, and it can be widely used for

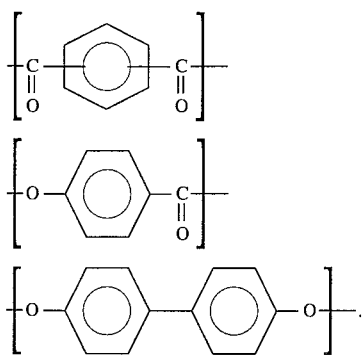

6. The hollow molded article container according to claim 1, wherein the liquid crystal polyester as the component (A) comprises the following repeating unit:

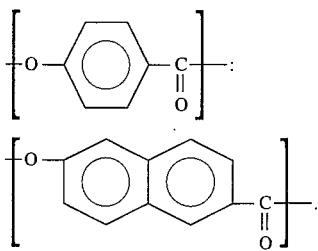

7. The hollow molded article container according to claim 1, wherein the liquid crystal polyester as the component (A) comprises the following repeating unit:

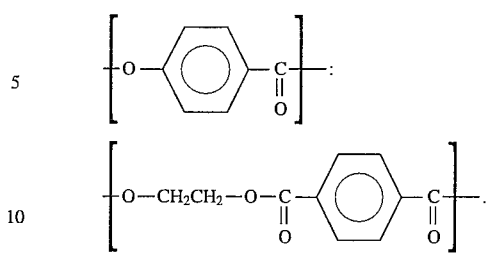

8. The hollow molded article container according to claim 1, wherein the epoxy group-containing ethylene copolymer as the component (B) has a stiffness within the range from 10 to 1300 kg/cm$^2$.

9. A hollow molded article container composed of a laminated structure comprising a layer of the liquid crystal polyester resin composition described in claim 1 and a layer of a thermoplastic resin.

10. The hollow molded article container according to claim 9, wherein the thermoplastic resin is at least one sort of a thermoplastic resin selected from polyolefin, polyester and polyamide.

11. The hollow molded article container according to claim 9, wherein the thermoplastic resin is a high-density polyethylene.

12. A method for producing the hollow molded article container of claim 1 or 9, which comprises producing by blow molding.

* * * * *